United States Patent [19]

Shimizu et al.

[11] Patent Number: 4,724,225

[45] Date of Patent: * Feb. 9, 1988

[54] SOLID CATALYST COMPONENT FOR α-OLEFIN POLYMERIZATION AND PROCESS FOR THE PRODUCING THE SAME

[75] Inventors: Hiroshi Shimizu, Chiba; Akihiro Sato; Toshihiro Uwai; Masami Tachibana, all of Ichihara, all of Japan

[73] Assignee: Chisso Corporation, Osaka, Japan

[*] Notice: The portion of the term of this patent subsequent to May 27, 2003 has been disclaimed.

[21] Appl. No.: 935,723

[22] Filed: Nov. 28, 1986

[30] Foreign Application Priority Data

Dec. 5, 1985 [JP] Japan .................................. 60-273649

[51] Int. Cl.$^4$ ................................................ C08F 4/64
[52] U.S. Cl. .................................... 502/107; 502/103; 502/105; 502/119; 502/121; 502/122; 502/123; 502/124; 502/125; 502/126; 502/127; 502/227; 502/527
[58] Field of Search ............... 502/103, 105, 107, 108, 502/119, 121, 122, 123, 124, 125, 126, 127, 227, 527

[56] References Cited

U.S. PATENT DOCUMENTS

| | | | |
|---|---|---|---|
| 4,368,304 | 1/1983 | Sato et al. | 502/126 X |
| 4,460,757 | 7/1984 | Sato et al. | 502/108 X |
| 4,514,513 | 4/1985 | Sato et al. | 502/119 X |
| 4,591,577 | 5/1986 | Sato et al. | 502/105 |
| 4,603,184 | 7/1986 | Sato et al. | 502/126 X |

*Primary Examiner*—Patrick P. Garvin
*Attorney, Agent, or Firm*—Fred Philpitt

[57] ABSTRACT

A solid catalyst component which can produce α-olefin polymers having a high stereoregularity and a good powder fluidity, stably and with a good efficiency in gas phase polymerization, particularly in gas phase copolymerization, a catalyst for α-olefin polymerization using the above solid catalyst component and a process for producing the above catalyst component, are provided, which solid catalyst component is charcterized in that it contains titanium as an active ingredient and is in the form of hollow fine particles, and which process is characterized by adding a reaction product (I) of an organoaluminum compound (A) with an electron dnor ($B_1$) to $TiCl_4$ and reacting these under agitation in a baffle ratio of 0.35 or less with a power required for agitation of 2.50 KW/m$^3$ or less at a temperature of 0° to 70° C. for a period of 1 to 10 hours and further reacting an electron donor ($B_2$) and an electron acceptor (E) with the resulting solid product (II) to obtain a solid product (III) i.e. the solid catalyst component.

9 Claims, 1 Drawing Figure

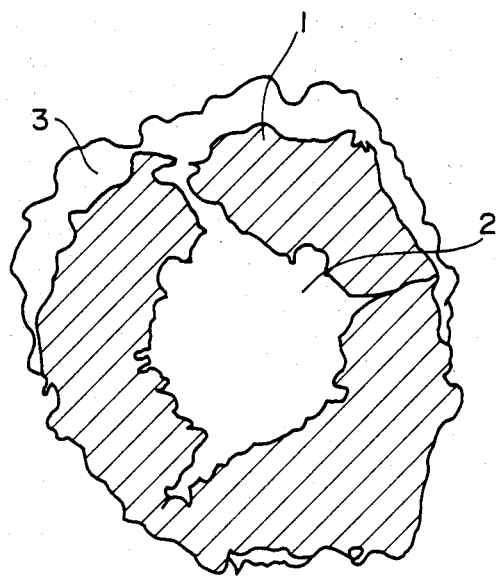

SOLID CATALYST COMPONENT FOR α-OLEFIN POLYMERIZATION AND PROCESS FOR THE PRODUCING THE SAME

BACKGROUND OF THE INVENTION

1. Field of the Invention

This invention relates to a novel solid catalyst component suitable to gas phase polymerization, particularly to gas phase copolymerization of α-olefins, a catalyst for α-olefin polymerization obtained by combining at least the above component with an organoaluminum compound and a process for producing the same.

More particularly the present invention relates to the above-mentioned solid catalyst component characterized in that it is a hollow particle having a shape close to sphere, a uniform particle size and a vacancy therein, a catalyst for α-olefin polymerization using the catalyst component and a process for producing them.

2. Description of the Related Art

In the production of α-olefin polymers, when the solid catalyst component used therein and the resulting polymer particles have a non-uniform particle size and are in the form of fine particles, handlings such as separation, drying, carrying, etc. thereof become difficult and also operational troubles due to scattering, adhesion, formation of mass inside the apparatus occur; such matters become a cause of productivity reduction and quality problem. It has been well known that disadvantages in the production process due to handling of such a solid catalyst component and polymer particles become more apparent in the production of α-olefin polymers produced by gas phase polymerization.

The present inventors have previously presented a process for producing polyemr particles having a small average particle diameter, a shape close to sphere and a narrow particle size distribution (Japanese patent application laid-open Nos. Sho 56-110,707/1981, Sho 56-120,712/1981, etc.; the inventions of these applications will hereinafter be often referred to as "previous inventions"). The solid catalysts used in these processes have such specific features that they have notably improved storage stability and thermal stability as compared with those of the prior catalysts of the same kind and also a high polymerization stability, and further, polymers obtained by using such catalysts have such specific features that they have a high bulk density and a high crystallinity of polymers, and furthermore since the polymers have a shape close to sphere and a uniform particle size, they are advantageous in the aspect of production and handling of polymers.

As described above, the prior inventions found by the present inventors have overcome the drawbacks of the prior art, but in the case of gas phase polymerization, particularly in the case of production of α-olefin copolymers by gas phase polymerization, solvent-soluble polymers which can be separated in the case of slurry polymerization, are contained in the polymer particles as an adhesive component; hence a production-operational problem accompanying the inferiority in the powder fluidity represented by powder characteristics such as increase in the angle of repose of polymer powder, notable change in the bulk density before and after tapping, etc. and also a quality problem caused thereby and the like problems have been liable to be raised. Accordingly it has been necessary to overcome these problems.

In general, as to powder fluidity, a correlationship is observed between the average particle diameter and the powder fluidity in the case of spherical particles having a uniform particle size, and the powder fluidity is improved in proportion to increase in the average particle diameter ("Powder", pages 740–744, coedited by Kiichiro Kubo, Eiji Minawata, Yuzo Nakagawa and Kyohhachiro Hayakawa).

In view of the above-mentioned knowledge, it may be considered that by increasing the size of the particles of the solid catalyst component for α-olefin polymerization catalysts, the average particle diameter of the α-olefin polymer particles obtained by using the resulting catalyst may be increased to thereby improve the powder fluidity of the polymer.

However, when the solid catalyst component having a particle size required for satisfying the improvement in the fluidity of the α-olefin polymer particles is used, the following various problems are raised, that is, the following disadvantages relative to productivity and qualities occur:

With regard to the catalyst performance, reduction in the polymer yield per the unit catalyst quantity; with regard to the polymerization activity, stereoregularity, etc., occurrence of deterioration of catalyst with lapse of time during the polymerization; and with regard to the process, reduction in the polymer productivity per the polymerization apparatus, increase in the load applied in the post-treatment process for making harmless the catalyst component contained in the polymer, and increase in the energy required when additives, etc. are caused to be melt-kneaded into the polymer in the granulation process, etc.

The present inventors have made extensive research in order to find a catalyst component which can overcome the above-mentioned disadvantages brought by the increase in the particle size of the solid catalyst component at the time of producing α-olefin polymers having a good powder fluidity by gas phase polymerization, and at the same time which can maintain the superior specific features of the catalysts in the production processes of α-olefin polymers offered formerly by the present inventors. As a result, the present inventors have found a hollowed solid catalyst component having a large average particle diameter, a uniform particle size and a vacancy inside the particle, and a process for producing the catalyst component, and further, when a catalyst obtained by combining the catalyst component with an organoaluminum compound is used, the above-mentioned object can be achieved.

As apparent from the foregoing, the object of the present invention is to provide a hollowed solid catalyst component which can produce α-olefin polymers having a high stereoregularity and a good fluidity, stably and with a good efficiency in gas phase polymerization, particularly in gas phase copolymerization, a catalyst for α-olefin polymerization using the above solid catalyst component and a process for producing the above catalyst component.

SUMMARY OF THE INVENTION

The present invention resides in:

(1) A solid catalyst component for α-olefin polymerization which contains titanium as an active ingredient and is in the form of hollow fine particles.

(2) A solid catalyst component according to item (1) wherein the ratio of the average diameter of the vacancy inside the particles to the average outer diameter of the particles is 0.1 or more.

(3) A solid catalyst component according to item (1) wherein particles having a ratio of the average diameter of the vacancy inside the particles to the average outer diameter of the particles of 0.1 or more are contained therein in 30% by weight or more based on the weight of the total particles of the solid catalyst component.

(4) A solid catalyst component according to item (1) which contains titanium and chlorine; has an average particle diameter of 15 to 80 microns; is hollow; and has a ratio of the diameter of the vacancy inside the particles to the outer diameter of the particles of 0.1 or more.

(5) A solid catalyst component according to item (1) which is a titanium trichloride composition having a diffraction line corresponding to a distance between gratings of 4.80 to 5.10 Å by way of diffraction of X-rays and a specific surface area of 100 m²/g or more.

(6) A process for producing a solid catalyst component for α-olefin polymerization, which process comprises adding a reaction product (I) of an organoaluminum compound (A) with an electron donor (B$_1$) to TiCl$_4$ and reacting these under agitation in a baffle ratio of 0.35 or less with a power required for agitation of 2.50 KW/m³ or less at a temperature of 0° to 70° C. for a period of 1 to 10 hours and further reacting an electron donor (B$_2$) and an electron acceptor (E) with the resulting solid product (II) to obtain a solid product (III).

(7) A production process according to item (6) wherein TiCl$_4$ diluted with an inert solvent is used.

(8) A production process according to item (6) wherein after completion of the addition of said reaction product (I), the reaction mixture is kept at the temperature and under the agitation at the time of the addition for 0.5 minute to 3 hours, and further kept at 50° to 90° C. for 5 minutes to 3 hours under agitation.

(9) A production process according to item (6) wherein a reaction product (I) obtained by reacting 1 to 4 mols of an electron donor (B$_1$) with one mol of an organoaluminum compound (A) in the presence of 0.5 to 3 l of an inert solvent, at −10° to +50° C. and for 30 seconds to 5 hours.

BRIEF DESCRIPTION OF THE DRAWING

The drawing illustrates an enlarged view (a view obtained by sketching the microscopic photograph) of the cut surface of one of polymer particles obtained by polymerizing propylene using an α-olefin polymerization catalyst according to the present invention.

1: Cut surface  2: Vacant part  3: Outer surface

DETAILED DESCRIPTION OF PREFERRED EMBODIMENTS

The constitution and effectiveness of the present invention will be described below in detail.

The solid catalyst component of the present invention has a shape and physical properties mentioned below in detail.

The hollowed solid catalyst component of the present invention having a large average particle diameter and capable of producing α-olefin copolymers having a superior powder fluidity refers desirably to a titanium trichloride composition which contains titanium and chlorine; has an average particle diameter of 15 to 80 microns, preferably 25 to 50 microns, and a size of its vacancy of 0.1 or more, preferably 0.3 or more, in terms of the ratio of the diameter of the vacancy inside the particles to the outer diameter of the particles; is contained in 30% or more, preferably 50% or more in terms of a proportion by weight thereof in the total catalyst particles; has a particle shape close to sphere; has a uniform particle size; has a diffraction line corresponding to a distance between the gratings of 4.80 to 5.10 Å by way of diffraction of X-rays; and has a specific surface area of 100 m²/g or more.

As to a preferred process for producing the solid product (III) i.e. the solid catalyst component of the present invention, an organoaluminum compound may be first reacted with an electron donor represented by organic ethers to obtain a reaction product (I), followed by reacting this product (I) with TiCl$_4$ to obtain a solid product (II) which is then reacted with an electron donor and an electron acceptor.

In order to obtain the solid catalyst component capable of retaining the particle size, the particle size distribution and the particle shape aimed in the above production process, it is necessary to add the reaction product (I) to TiCl$_4$ at a relatively high temperature and under agitation with a power required for low agitation, and thereby slowly deposit and grow the particles of the solid product (II) through reaction. The time required for adding the total quantity of the reaction product (I) to TiCl$_4$ is at least one hour, preferably 3 hours or longer, and addition of a solvent to TiCl$_4$ in advance affords desirable results.

As to the particle size of the thus obtained solid catalyst component, it is possible to adjust the particle size to an optional average particle diameter between 15 and 80 microns, depending on the preparation conditions, and there is observed a tendency that the proportion in which the particles are hollowed, is generally proportional to the particle size.

The hollowed solid catalyst component having a vacancy inside the particle has a sufficient resistance to shear and resistance to grinding, in the process of combining the component with an organoaluminum compound to prepare an α-olefin polymerization catalyst, and further even in the process of α-olefin polymerization at relatively high temperatures. Further, α-olefin polymer particles obtained using this catalyst, too, are obtained in a hollowed shape having a vacancy inside the polymer, like the generally observed phenomenon in the α-olefin polymerization by the use of the so-called Ziegler-Natta catalyst that the polymer particles are obtained in the shape of a replica having enlarged the particles of the solid catalyst component.

More particularly, as to the production process of the solid catalyst component, a case where TiCl$_4$ is used as a liquid transition metal compound will be described below.

As a preferred embodiment of the present invention, the reaction product (I) is first prepared according to the following process:

The reaction of an organoaluminum compound (A$_1$) with an electron donor (B$_1$) is carried out in an inert solvent (D$_1$) at −10° C. to +50° C. for 30 seconds to 5 hours, and as to the proportions of the respective compounds used, 1 to 4 mols of the electron donor and about 0.5 to 3 l of the solvent based on one mol of the organoaluminum compound are suitable. Examples of the solvent used are aromatic hydrocarbons, alicyclic hydrocarbons and saturated aliphatic hydrocarbons, but among these, saturated aliphatic hydrocarbons are preferred in that the performance of the catalyst finally obtained is superror and the adjustment of the particle size is easy.

The molar ratio of the electron donor ($B_1$) to the organoaluminum compound ($A_1$) has correlationships with the particle size, particle size distribution and particle strength of the aimed solid catalyst component, respectively, and since there is a tendency that when the molar ratio is low, the particle size increases, but the particle size distribution becomes broad and also the particle becomes brittle; hence in order to adequately retain the particle size, particle size distribution and particle strength, the above-mentioned molar ratio range is preferred.

The thus obtained reaction product (I) is dropwise added to $TiCl_4$, preferably to $TiCl_4$ having a solvent ($D_2$) added in advance, with stirring, at a temperature of 0° to 70° C., preferably 10° to 50° C., over a period of one to 10 hours.

Examples of the solvent added to $TiCl_4$ are aromatic hydrocarbons, alicyclic hydrocarbons and saturated aliphatic hydrocarbons, and among these, saturated aliphatic hydrocarbons are preferred for the same reason as that described in the paragraph of the preparation of the reaction product (I). Further, the solvent ($D_2$) used at that time may be the same as or different from the solvent ($D_1$) used at the time of the preparation of the reaction product (I).

The reaction is carried out in a ratio (Al/Ti) of the atom number of Al in the reaction product (I) to the atom number of Ti in $TiCl_4$ of 0.05 to 1.0, preferably 0.06 to 0.2. Further, as to the quantity of the solvent added to the $TiCl_4$, if the quantity ratio of the solvent used at the time of preparation of the reaction product (I) (quantity per mol of the organoaluminum compound) is less than 3 l, the above quantity of the solvent is preferred to be a quantity short of 3 l or less. In other words, the total quantity of the solvent in the reaction system wherein the total quantity of the reaction product (I) is mixed with $TiCl_4$ or $TiCl_4$ having an solvent added, is preferred to be 3 l or less per mol of the organoaluminum compound.

The quantity ratio of the solvent used in the preparation of the reaction product (I) and the quantity ratio of the solvent added to $TiCl_4$ in advance, both have correlationships with the particle size of the resulting solid catalyst component and further the vacancy diameter ratio thereof (the ratio of the diameter of the vacancy inside the particles to the outer diameter of the particles; this applies to the later description), and in view of the effectiveness of the solvent quantity upon the particle size and particle size distribution of the component, when the total quantity of the solvent used is made constant, it affords desirable results to reduce the quantity ratio used at the time of preparation of the reaction product (I) and increase the quantity ratio used at the time of being added to $TiCl_4$.

As to the agitation at the time of mixing the reaction product (I) with the $TiCl_4$ solvent solution or $TiCl_4$, it is preferred to carry out the reaction under agitation at a baffle rate of 0.35 or less, preferably 0.05 or more (this rate being defined by $(B/D)^{1.2} \times nB$ wherein B represents the width (m) of a baffle plate; D, the diameter (m) of the reactor; and nB, the number of baffle plates), and with a power required for the agitation (represented by power (KW) consumed per unit volume ($m^3$)) of 2.50 $Kw/m^3$ or less, preferably 0.20 $Kw/m^3$ or more and 1.0 $Kw/m^3$ or less.

Main means for controlling the particle size of the solid catalyst component finally obtained by this reaction consist in control of the power required for the agitation at the time of mixing the reaction product (I) with $TiCl_4$ and control of the time required for dropwise adding the reaction product (I); thus since the increase in the power required for the agitation and the extension of the time required for the dropwise addition tend to broaden the particle size distribution, these are both preferred to be the upper limits of the above-mentioned ranges or less.

After completion of the dropw.ise dropping of the total quantity of the reaction product (I), the mixture solution was kept with stirring at the same temperature as that at the time of the dropwise dropping and further for 0.5 to 3 hours, followed by raising the temperature up to 50° to 90° C. and further reacting it at the same temperature for 5 minutes to 3 hours.

After completion of the reaction, the resulting liquid portion was separated and removed by means of filtering-off or decantation at a temperature of 50° C. or higher, followed by further washing with a solvent at 30° C. or higher, and then reacting an electron donor ($B_2$) and an electron acceptor (E) with the resulting solid product (II). At the time of this reaction, coexistence of a solvent such as aliphatic hydrocarbons affords desirable results. The respective quantities used are preferred to be 50 to 200 g of ($B_2$), 20 to 500 g of (E) and 100 to 1,000 ml of the solvent, based on 100 g of the solid product (II), and the reaction is preferred to be carried out at 50° to 100° C. for 5 minutes to 5 hours. After completion of the reaction, the liquid portion is separated and removed by filtering-off or decantation, followed by repeatedly washing with a solvent to obtain a solid product (III) i.e. the solid catalyst component. The thus obtained solid catalyst component is dried and taken out in the form of solids or subjected to the subsequent use in a suspended state in a solvent as it is.

The thus obtained solid catalyst component is a titanium trichloride composition which contains titanium and chlorine; consists of particles close to sphere having an average particle diameter of 15 to 80 microns, most of the particles having a vacancy, a uniform particle size, a diffraction line corresponding to the distance between the gratings, of 4.80 to 5.10 Å through diffraction by way of X-rays, and a specific surface area of 100 $m^2/g$ or more.

The α-olefin polymerization catalyst relative to the present invention is a catalyst obtained by at least combining the solid catalyst component with an organoaluminum compound. Its concrete examples are (1) a preactivated catalyst obtained by combining the solid catalyst component with an organoaluminum compound ($A_2$), followed by reacting an α-olefin ($F_1$) with the combination; (2) a preactivated catalyst obtained by combining the solid catalyst component, an organoaluminum compound ($A_2$) and an electron donor ($B_3$), followed by reacting an α-olefin ($F_1$) with the combination; (3) a preactivated catalyst obtained by adding an electron donor ($B_4$) after the procedure of the above paragraph (1) or (2); (4) a preactivated catalyst obtained by adding a reaction product (G) of an electron donor ($B_4$) with an organoaluminum compound ($A_3$) after the procedure of the above paragraph (1) or (2); etc.

The preactivation is carried out using, based on 1 g of the solid catalyst component, 0.1 to 10 g of an organoaluminum compound ($A_2$), 0 to 5 l of a solvent, 0.001 to 1.0 g of an electron donor (B$_3$), 0.05 to 3,000 g of an α-olefin (F$_1$) and 0.01 to 5.0 g of an electron donor (B$_4$) or 0.02 to 15 g of a reaction product (G) obtained by reacting 0.01 to 5.0 g of an electron donor (B$_4$) with 0.01 to 10 g of an organoaluminum compound (A$_3$) in 10 to 10,000 g of a solvent at 0° to 100° C. for one minute to 20 hours.

The reaction of an α-olefin (F$_1$) may be carried out in an aliphatic hydrocarbon solvent or in a liquefied α-olefin such as liquefied propylene, liquefied butene, etc. or in a gas phase of ethylene, propylene, etc. Further, it may also be carried out in the coexistence of an α-olefin polymer prepared in advance or hydrogen. The reaction of an α-olefin may be carried out at 0° to 100° C., preferably 10° to 80° C., for one minute to 20 hours.

Examples of α-olefins (F$_1$) used for preactivation are ethylene, propylene, butene-1, hexene-1, heptene-1, 4-methyl-pentene-1, 2-methyl-pentene-1, 3-methyl-butene-1, styrene, etc., and a plurality of α-olefins may be used stepwise or in admixture. These α-olefins may be the same as or different from α-olefins to be subjected to normal polymerization. After completion of the preactivation, the solvent, a portion of the organoaluminum compound and unreacted α-olefin may be removed by filtering off or distilling off under reduced pressure and the resulting dried powder particles may be used for polymerization, or such particles may be further diluted by adding a solvent and used.

The thus obtained α-olefin polymerization catalyst can be used for α-olefin slurry polymerization, bulk polymerization, gas phase polymerization accompanied with no phase change, bulk polymerization followed by gas phase polymerization or slurry polymerization followed by gas phase polymerization; the catalyst inhibits increase of byproducts such as atactic polypropylene, has a high activity and when applied to gas phase polymerization, affords a polymer particularly abundant in powder fluidity.

The α-olefin polymerization catalyst relative to the present invention may be used for homopolymerization of ethylene, propylene, butene-1, hexene-1, 4-methyl-pentene-1, etc., but when it is used for random copolymerization of propylene with ethylene, propylene with butene-1, propylene with hexene-1, propylene with 4-methyl-pentene-1, etc., terpolymerization of propylene-ethylene-butene-1, propylene-ethylene-hexene-1, etc., or block copolymerization of propylene with ethylene, propylene-ethylene-butene-1, propylene-ethylene-hexene-1, etc., the catalyst exhibits a good effectiveness.

The organoaluminum compound used for the above catalyst relative to the present invention is expressed by the formula AlR$_n$R'$_{n'}$X$_{3-(n+n')}$ wherein R and R' each represent a hydrocarbon group such as alkyl group, aryl group, alkaryl group, cycloalkyl group, etc. or an alkoxy group; X represents a halogen of F, Cl, Br or I; and n and n' each represent an optional number of $0 < n + n' < 3$.

Concrete examples thereof are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., diethylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., alkylaluminum hydrides such as diethylaluminum hydride, etc., and alkylaluminum halides such as methylaluminum sesquichloride, ethylaluminum sesquichloride, ethylaluminum dichloride, i-butylaluminum dichloride, etc., and besides, alkoxyalkylaluminums such as monoethoxydiethylaluminum, diethoxymonoethylaluminum, etc. may be also used. These organoaluminum compounds may be used in admixture of two or more kinds. The organoaluminum compound (A$_1$) for obtaining the reaction product (I), the organoaluminum compound (A$_2$) to be combined with the solid catalyst component and the organoaluminum compound (A$_3$) to be combined with the electron donor (B$_4$), used in the present invention may be the same or different.

Examples of the respective components constituting the electron donors (B$_1$), (B$_2$), (B$_3$) and (B$_4$) are organic compounds or inorganic compounds containing either atoms of oxygen, nitrogen, sulfur or phosphorus such as ethers, alcohols, esters, aldehydes, fatty acids, ketones, nitriles, amines, amides, ureas, thioureas, isocyanates, azo compounds, phosphines, phosphites, phosphinites, carbonyl sulfide, hydrogen sulfide, thioethers, thioalcohols, etc. Concrete examples are ethers such as diethyl ether, di-n-propyl ether, diisopropyl ether, methyl n-butyl ether, methyl t-butyl ether, ethyl n-propyl ether, di-n-butyl ether, di-n-pentyl ether, di-(2-methylbutyl) ether, di-(3-methylbutyl) ether, methyl n-amyl ether, methyl isoamyl ether, ethyl n-amyl ether, ethyl neopentyl ether, di-n-hexyl ether, di-i-hexyl ether, ethyl n-hexyl ether, ethyl α-methylhexyl ether, di-n-octyl ether, di-i-octyl ether, di-n-dodecyl ether, diphenyl ether, ethylene glycol monomethyl ether, diethylene glycol dimethyl ether, triethylene glycol dimethyl ether, tetraethylene glycol dimethyl ether, tetrahydrofuran, etc.; alcohols such as methanol, ethanol, propanol, butanol, n-amyl alcohol, isoamyl alcohol, 2-methylbutanol, hexanol, octanol, phenol, cresol, xylenol, ethylphenol, naphthol, etc.; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate, etc.; aldehydes such as formaldehyde, acetoaldehyde, butyraldehyde, benzaldehyde, etc.; fatty acids such as formic acid, acetic acid, propionic acid, butyric acid, oxalic acid, succinic acid, acrylic acid, maleic acid and the like; aromatic acids such as benzoic acid and the like; ketones such as methyl ethyl ketone, methyl isobutyl ketone, benzophenone and the like; nitriles such as acetonitrile, etc.; amines such as methylamine, diethylamine, tributylamine, triethanolamine, β(N,N-dimethylamino)ethanol, pyridine, quinoline, α-picoline, 2,4,6-trimethylpyridine, N,N,N',N'-tetramethylhexaethylene diamine, aniline, dimethylaniline and the like; amides such as formamide, hexamethylphosphoric acid triamide, N,N,N',N',N''-pentamethyl-N'-β-dimethylaminomethylphosphoric acid triamide, octamethylpyrophosphoroamide and the like; ureas such as N,N,N',N'-tetramethylurea and the like; isocyanates such as phenylisocyanate, toluylisocyanate and the like; azo-compounds such as azobenzene, azotoluene, and the like; phosphines such as ethylphosphine, triethylphosphine, tri-n-butylphosphine, tri-n-octylphosphine, triphenylphosphine, triphenylphosphine oxide and the like; phosphites such as dimethylphosphite, di-n-octylphosphite, triethylphosphite, tri-n-butylphosphite, triphenylphosphite; phosphinites such as ethyldiethylphosphinite, ethyldibutylphosphinite, pehnyldiphenylphosphinite and the like; thioethers such as diethyl thioether, diphenyl thioether, methyl phenyl thioether, ethylene sulfide, propylene sulfide and the like; and thioalcohols such as n-propylthioalcohol, thiophenol and the like. These electron donors may be used in admixture of two or more kinds. The electron donor ($B_1$) for obtaining the reaction product (I), ($B_2$) to be reacted with the solid product (II), ($B_3$) used for preactivation and ($B_4$) for obtaining the reaction product (G) may be the same or different, respectively.

The electron acceptors (E) employed in the present invention are represented by halides of elements of Groups III to VI of the Periodic Table. Concrete examples are anhydrous aluminum chloride, $SiCl_4$, $SnCl_2$, $SnCl_4$, $TiCl_4$, $ZrCl_4$, $PCl_3$, $PCl_5$, $VCl_4$, $SbCl_5$, etc. These may be used in admixture. $TiCl_4$ is most preferred.

As the solvents ($D_1$ and $D_2$), the following may be used: aliphatic hydrocarbons such as n-pentane, n-hexane, n-heptane, n-octane, isooctane, etc.; alicyclic hydrocarbons used in place of or together with aliphatic hydrocarbons such as cyclohexane, cycloheptane, cyclooctane, methylcyclopentane, methylcyclohexane, etc.; and aromatic hydrocarbons such as benzene, toluene, xylene, etc.

The first effectiveness of the present invention consists in that it has become possible to notably improve the powder fluidity of α-olefin copolymers accompanied with a large quantity of adhesive polymer formed in the gas phase copolymerization, and carry out a long time stabilized operation to give an α-olefin polymer having a stabilized quality.

The second effectiveness of the present invention consists in that the disadvantage accompanying the increase in the particle size of the solid catalyst component i.e. reduction in the catalyst performance is inhibited to thereby maintain the effectiveness of the prior inventions made by the present inventors; namely, the resulting solid catalyst component has a high storage stability and even when the solids are allowed to stand at a high temperature of about 30° C. for about 4 months, no reduction in the polymerization activity occurs to make it unnecessary to cool them down to about 0° C. and store it, and further even when an α-olefin polymerization catalyst obtained by combining the component with an organoaluminum compound, etc. is allowed to stand at 30° C. or higher, neither large reduction in the polymerization activity nor shape degradation of polymer particles occurs, and still further, the component has a high stereoregularity at relatively high polymerization temperatures of 70° C. or higher and can inhibit the shape degradation of polymer particles.

The third effectiveness of the present invention consists in that along with the effectiveness that even when the particle size is large, it is possible to obtain the polymer with a high catalyst efficiency, since the polymer particles have a specific shape of containing a vacancy therein, it is possible to reduce the load of post-treatment step for making the catalyst component harmless, and also it is possible to well disperse a liquid treating agent, additive, etc. in the polymer, and further it is possible to inhibit the increase in the specific energy at the step of kneading the above materials in the polymer under molten state, followed by pelletizing the blend.

The fourth effectiveness of the present invention consists in that since the solid catalyst component has a vacancy, α-olefin polymer particles having a large surface area as compared with the particle diameter of particles are obtained, whereby it is possible to produce the polymer with a high efficiency at the time of chemical treatment carried out for modifying the processing characteristics, affording dyeability or for other purposes, for example at the time of graft polymerization under immersion in a polar monomer or in a dispersion state in the presence of a radical-generating agent.

The present invention will be described in more detail by way of Examples.

EXAMPLE 1

(1) Preparation of solid catalyst

A 5 l capacity reactor having an inner diameter of 180 mm, a height of 220 mm and a semi-spherical bottom surface was fitted with 4 baffle plates having a lateral width of 15 mm and a length of 130 mm (baffle ratio: 0.20) and an agitating element. Separately, a solution of diethylaluminum monochloride (DEAC) (1.01 mol) dissolved in n-hexane (1.49 l) was mixed with diisoamyl ether (2.42 mols) over 5 minutes and the mixture was kept at 35° C. for one hour for reaction to obtain a reaction product (I) (hereinafter referred to often as reaction fluid) (molar ratio of diisoamyl ether/DEAC: 2.40).

Into the above-mentioned reactor purged with nitrogen was introduced $TiCl_4$ (9.10 mols) and the mixture was heated to 40° C. While it was agitated at 320 rpm (revolutions per minute), the above-mentioned reaction fluid (I) was dropwise added thereto at 40° C. over 4 hours. After completion of addition of the total quantity, the power required for the agitation ($KW/m^3$) was measured to give 0.23. While this agitation was kept, the mixture was kept at 40° C. for one hour, followed by raising the temperature up to 78° C., further reacting the resulting material for one hour, precipitating it at the same temperature, removing the supernatant, twice repeating a procedure of adding n-hexane (3 l) and removing the supernatant by decantation, suspending the resulting solid product (II) (346 g) in n-hexane (700 ml), adding $TiCl_4$ (637 g) and diisoamyl ether (533 g), reacting the mixture at 70° C. for one hour, removing the supernatant at 35° C. after completion of the reaction, 5 times repeating a procedure of adding n-hexane (3 g) and washing therewith, and drying under reduced pressure to obtain a solid catalyst component (340 g).

(2) Measurement of physical properties of the solid catalyst component:

(2-1) Measurements of average particle diameter (dv) and particle size distribution (Qa):
  dv: Average volume diameter $(\Sigma vd^3 \Sigma v)^{\frac{1}{3}}$ sought from the measured values obtained by measuring the diameters of 100 particles or more of the above-obtained solid catalyst component through the microscopic photographs thereof.
  Qa: Arithmetic quartering deviation sought from intergrated mean volume diameter curve.

The dv and Qa sought according to the above-mentioned methods were 34.8 microns and 1.3 micron, respectively.

(2-2) Measurement of hollowed particles:

The solid catalyst component was consolidated with solid paraffin, followed by cutting the resulting material by means of a microtome, and calculating the proportion by weight of particles each clearly having a vacancy in 20 particles or more of the cut solid catalyst component through microscopic photographs. The proportion was 90% or more and the average value of the ratio of the diameter of the vacancy inside the particles to the outer diameter of the particles was 0.3.

(2-3) Measurement of specific surface area:

The specific surface area was measured according to BET method by means of an instrument of Accusorb 2100 type (tradename of instrument manufactured by Micromeritics Company) to give 172 m²/g.

(2-4) Diffraction by X-rays:

Diffraction by means of X-rays was carried out according to powder method by means of goniometer (manufactured by Rigaku Denki Company) with CuK α rays (λ=1.54 Å), using nickel as filter under 40 KV and 20 mA. As a result, a diffraction line corresponding to a distance between the gratings of 4.85 Å was observed.

(3) Preparation of α-olefin polymerization catalyst

Into a 2 l capacity stainless reactor equipped with slant stirring blades and purged with nitrogen gas were added n-hexane (20 ml), diethylaluminum monochloride (105 mg), diethylene glycol dimethyl ether (2.3 mg) and the solid catalyst component obtained in the above paragraph (1) (32 mg), followed by introducing hydrogen gas (150 ml), carrying out reaction under a propylene partial pressure of 0.7 Kgl/cm²G for 3 hours, raising the propylene partial pressure up to 5 Kg/cm²G to further carry out reaction for 30 minutes, and removing unreacted propylene, hydrogen and n-hexane under reduced pressure to obtain a preactivated catalyst in the form of powder particles. The quantity of propylene reacted per g of the solid catalyst component was 157 g.

(4) Gas phase polymerization

Into the above reactor containing the preactivated catalyst were introduced diethylaluminum monochloride (210 mg) and hydrogen (500 ml), followed by feeding ethylene in a quantity of 7% by mol based on the quantity of propylene polymerized and consumed, under a propylene partial pressure of 22 Kg/cm²G at 70° C. for 2 hours to copolymerize propylene with ethylene.

After completion of the reaction, methanol (3 g) was introduced to carry out killing reaction at 70° C. for 30 minutes, followed by cooling down to room temperature and drying the resulting polymer to obtain a propylene-ethylene copolymer (202 g) (ethylene content: 6.2%, MFR: 2.1).

The polymer had a BD (bulk density) of 0.44; its shape was close to a sphere; polymer particles having sizes in the range of 16 meshes and 42 meshes occupied 98.3% of the total polymer particles; and the quantities of fine powder and aggregate were very small. The angle of repose of the polymer measured at room temperature according to cylinder revolution method was 37.5°; the percentage compaction of BD sought according to the following calculation method was 9.0%; no coloration of the polymer was observed; and its yellowness index was 2.7.

Percentage compaction of $BD =$ $$\frac{BD \text{ before tapping} - BD \text{ after tapping}}{BD \text{ before tapping}} \times 100$$

Further, most of the resulting polymer particles were hollowed particles having a vacancy in a vacancy diameter ratio of 0.4–0.6.

COMPARATIVE EXAMPLE 1

Example 1 was repeated except that the reaction fluid (I) in Example 1-(1) was dropwise added to TiCl₄ over 30 minutes to obtain a solid catalyst component.

The resulting solid catalyst component had an average diameter (dv) of 10.1 and an arithmetic quartering deviation (Qa) of 0.9μ. Further, no vacancy was observed in the solid catalyst component. An α-olefin polymerization catalyst was prepared in the same manner as in Example 1 and propylene-ethylene copolymerization. was carried out.

COMPARATIVE EXAMPLE 2

Example 1 was repeated except that the reaction fluid (I) in Example 1-(1) was dropwise added to TiCl₄ over 30 minutes and after completion of dropwise addition of its total quantity, the resulting fluid was kept at 40° C. for 4.5 hours to obtain a solid catalyst component.

The resulting solid catalyst component had an average particle diameter (dv) of 13.3μ and an arithmetic quartering deviation (Qa) of 1.2 μ. Further, vacancy of particles was observed only in a portion of particles having an average particle diameter or more (10% by weight or less based on the weight of the total particles). An α-olefin polymerization catalyst was then prepared in the same manner as in Example 1 and propylene-ethylene copolymerization was carried out.

COMPARATIVE EXAMPLE 3

Example 1 was repeated except that the reaction fluid (I) in Example 1 was dropwise added to TiCl₄ and agitation was carried out at 610 rpm to obtain a solid catalyst component. In addition, the power required for the agitation at the above agitation revolution number at the time of completion of the dropwise addition of the total quantity of the reaction fluid (I) was 2.74 KW/m².

The resulting solid catalyst component had an average particle diameter (dv) of 17.3μ, but its particle size distribution had two peaks in the vicinity of 13 micrrons and in the vicinity of 21 microns, that is, was very broad (Qa=3.7 microns). Further, particles having the vacancy were observed only in a portion of particles having an average particle diameter or more (its proportion: a bit exceeding 10% by weight based on the weight of the total particles). Thereafter, in the same manner as in Example 1, an α-olefin polymerization catalyst was prepared and propylene-ethylene copolymerization was carried out.

REFERENCE EXAMPLE 1

A solid catalyst component was prepared in the same manner as disclosed in Example 1 of Japanese patent publication No. Sho 53-3356/1978 except that the reactor used in Example 1 of the specification of the present application was used and the production scale was made twice.

The above patent publication is directed to a process for producing a TiCl₃ composition as a solid catalyst component wherein TiCl₄ is reduced with an organoaluminum compound, followed by treating the reduction solids with an organoaluminum compound as a complexing agent, and reacting the resulting solids with TiCl$_4$.

For reference, the above Example 1 of the publication No. Sho 53-3356 will be described below as it is as described therein.

EXAMPLE 1 OF THE ABOVE PUBLICATION

A. Preparation of reduction slids

Hexane (600 ml) and TiCl$_4$ (150 ml) are introduced into a 2 l capacity reactor equipped with a stirrer fitted with two blades revolving at 160 rpm in an inert atmosphere, followed by cooling a hexane-TiCl$_4$ solution (250 ml/1 l diluent) down to 1° C., adding a solution of AlEt$_2$Cl (173 ml) dissolved in dry hexane (450 ml) (250 ml/1 l diluent) within 4 hours, and keeping the temperature inside the reactor at 1° C.

After addition of the hexane-AlEt$_2$Cl solution, a reaction medium comprising a suspension of fine particles was kept at 1° C. for about 15 minutes with stirring, followed by raising the temperature up to 65° C. within about one hour and then further keeping the reaction medium at 65° C. for one hour with stirring.

The resulting liquid phase was then separated from solids by filtration, followed by 5 times washing the resulting brown solid product with dry hexane (500 ml). At that time, the solids are re-suspended at the time of each of the washings. Finally, hexane absorbed by flushing with nitrogen is removed from the solid product. The resulting dried product (285 g) was collected, which product will hereinafter be referred to as "reduction solids". This product contains about 200 g of TiCl$_3$ in the form of β-type crystals.

B. Treatment of reduction solids with complexing agent

The resulting reduction solids (285 g) are suspended in a diluent (hexane) (1,720 ml), followed by adding thereto diisoamyl ether (EDIA) (256 ml). This suspension corresponds to 0.95 mol of EDIA per mol of TiCl$_3$ and 11.6 g of EDIA per l of the diluent. The suspension is agitated at 35° C. for one hour, followed by separating the resulting "treated solids" from the liquid phase, 5 times washing with hexane (500 ml) at 25° C. The treated solids may be optionally dried with dry nitrogen.

C. Reaction of the treated solids with TiCl$_4$

The treated solids are suspended in a 40% by volume solution (850 ml) of TiCl$_4$ in hexane, followed by keeping the suspension at 65° C. for 2 hours with stirring, then removing the liquid phase, 4 times washing the resulting solid product i.e. the so-called "solid catalyst complex" with hexane (500 ml) at 25° C., finally once washing with hexane (500 ml) at 65° C., separating the resulting solid catalyst complex from hexane, drying with purified dry nitrogen and collecting dry solid catalyst complex (256 g).

D. Characteristics of the treated solids and catalyst complex (The succeeding description is omitted)

The thus obtained solid catalyst component was of spherical particles having an average particle size (dv) of 27.3 microns and an arithmetic quartering deviation (Qa) of 1.0 micron. Further, no vacancy was observed in the particles of the solid catalyst component.

Next, an α-olefin polymerization catalyst was prepared in the same manner as in Example 1 of the present invention, and propylene-ethylene copolymerization was carried out. No vacancy was also observed in the resulting polymer particles.

TABLE 1

| Example Compar. ex. and Reference ex. | Yield of copolymer per g of solid cat. component (g) | Ethylene content in copolymer (wt. %) | *MFR | BD (g/ml) | Proportion of hollowed particles (%) | Vacancy diameter ratio | 4 Meshes on (%) | 70 Meshes pass (%) | Angle of repose (°) | Percentage compaction of BD (%) | **YI |
|---|---|---|---|---|---|---|---|---|---|---|---|
| Ex.-1 | 6310 | 6.2 | 2.1 | 0.44 | >90 | 0.3 | 0.3 | 0.5 | 37.5 | 9.0 | 2.7 |
| Com. ex.-1 | 5920 | 6.4 | 1.9 | 0.41 | 0 | 0 | 7.3 | 23.1 | 41.5 | 17.0 | 3.4 |
| Com. ex.-2 | 6360 | 5.9 | 2.0 | 0.42 | <10 | 0.1 | 5.7 | 17.6 | 41.0 | 14.3 | 3.0 |
| Com. ex.-3 | 5830 | 6.3 | 2.3 | 0.42 | <20 | 0.2 | 8.4 | 20.4 | 39.0 | 11.9 | 3.1 |
| Ref. ex.-1 | 4870 | 6.3 | 2.4 | 0.41 | 0 | 0 | 0.2 | 0.3 | 40.0 | 15.0 | 3.9 |
| Ref. ex.-2 | 4350 | 6.0 | 2.5 | 0.40 | 0 | 0 | 0.3 | 0.4 | 39.0 | 17.0 | 4.2 |

Note:
*Melt flow rate (according to ASTM D-1238 (L))
**Yellowness index (according to K 7103)

EXAMPLE 2

Into a 2 l capacity stainless reactor equipped with slant blades and purged with nitrogen gas were added propylene (30 g), diethylaluminum monochloride (105 mg), the solid catalyst component (35 mg) obtained in Example 1 and hexamethylphosphoric acid triamide (4.4 mg), followed by reacting the mixture under 9.8 Kg/cm$^2$G for 15 minutes, and removing unreacted propylene to obtain a preactivated catalyst in the form of powder particles (propylene reacted per g of the solid catalyst component: 160 g).

Into the above reactor containing the resulting preactivated catalyst were introduced diethylaluminum monochloride (210 mg) and hydrogen (300 ml), followed by carrying out propylene gas phase polymerization under a propylene partial pressure of 25 Kg/cm$^2$G at a polymerization temperature of 70° C. for 1.5 hour. After completion of the reaction, methanol (3 g) was added to carry out killing reaction at 70° C. for 30 minutes, followed by cooling down to room temperature and drying the resulting polymer to obtain a polymer (151 g).

The polymer yield per g of the solid catalyst component was 4,310 g. The isotactic index (in terms of the proportion of isotactic polypropylene as n-hexane (at 20° C.)-insolubles based on 100 g of the total polymer formed) was 99.5%. BD: 0.47 The particles had a shape close to sphere, and most of the particles were hollowed ones each having a vacancy in a vacancy diameter ratio of 0.4.

EXAMPLES 3–7

Example 1 was repeated except that n-hexane and its quantity (1.49 l) used in the preparation of the reaction product (I) in Example 1 was replaced by various kinds of solvents and varied quantities thereof indicated in Table 2 to obtain solid catalysts, followed by preparing α-olefin polymerization catalysts and carrying out propylene gas phase-polymerization in the same manner as in Example 2.

The results of Examples 3–7 are shown in Table 2 together with those of Example 2.

TABLE 2

Preparation conditions of solid catalyst component and polymerization results (I)

| Example | Amount of DEAC diluent solvent (l) | Power required for agitation (KW/m³) | dv micron | Qa micron | In polymer particle Proportion of hollowed particles (%) | Vacancy diameter ratio |
|---|---|---|---|---|---|---|
| 2 | 1.49 | 0.23 | 34.8 | 1.2 | >90 | 0.4 |
| 3 | 1.03 | 0.26 | 20.3 | 0.9 | >50 | 0.2 |
| 4 | 2.13 | 0.23 | 41.1 | 1.4 | >90 | 0.4 |
| 5 | 1.49 | 0.22 | 33.0 | 1.2 | >90 | 0.2 |
| 6 | " | 0.25 | 36.3 | 1.4 | >90 | 0.3 |
| 7 | " | 0.24 | 33.7 | 1.3 | >75 | 0.2 |

| Example | Polymer yield per g of solid catalyst component (g) | Isotactic index (%) | BD (g/ml) | Average particle diameter of powder micron | MFR | YI |
|---|---|---|---|---|---|---|
| 2 | 4310 | 99.5 | 0.47 | 680 | 3.4 | 3.0 |
| 3 | 4280 | 99.4 | 0.48 | 430 | 3.5 | 2.7 |
| 4 | 4230 | 99.4 | 0.45 | 820 | 3.4 | 3.0 |
| 5 | 4180 | 99.2 | 0.46 | 670 | 3.1 | 2.8 |
| 6 | 4330 | 99.3 | 0.45 | 730 | 3.0 | 2.9 |
| 7 | 4080 | 98.8 | 0.44 | 650 | 4.1 | 2.7 |

Note:
DEAC diluent solvent (No. 2–4: n-hexane, No. 5, 6, 7: n-heptane, n-octane and isooctane, respectively)

EXAMPLE 8

Example 1 was repeated except that the quantity of n-hexane (1.49 l) used in the preparation of the reaction fluid (I) in Example 1 was replaced by 0.90 l to prepare the reaction fluid (I), which was then dropwise added to TiCl₄ having n-hexane (0.59 l) added in advance, to obtain a solid catalyst, and propylene gas phase polymerization was carried out as in Example 2.

EXAMPLES 9–14

Example 8 was repeated except that the kind and quantity of the solvent and the kind and quantity of the solvent added to TiCl₄ used in the preparation of the reaction fluid (I) were replaced by those indicated in Table 3 to prepare solid catalysts, followed by preparing an α-olefin polymerization catalyst and carrying out propylene gas polymerization as in Example 2.

The results of Examples 9–14 are shown in Table 3 together with those of Example 8.

TABLE 3

Preparation conditions of solid catalyst component and polymerization results (II)

| Example | Amount of DEAC diluent solvent (l) | Solvent added to TiCl₄ Kind | Amount (l) | Power required for agitation (KW/m³) | dv micron | Qa micron |
|---|---|---|---|---|---|---|
| 8 | 0.90 | n-hexane | 0.59 | 0.24 | 41.7 | 1.1 |
| 9 | " | n-octane | " | 0.25 | 43.1 | 1.1 |
| 10 | " | hexane | " | 0.26 | 42.3 | 1.2 |
| 11 | " | cyclohexane | " | 0.23 | 40.5 | 1.2 |
| 12 | " | toluene | " | 0.26 | 39.8 | 1.0 |
| 13 | 0.74 | n-octane | 0.75 | 0.25 | 45.1 | 1.1 |
| 14 | 1.03 | hexane | 1.10 | 0.25 | 52.4 | 1.3 |

| Example | In polymer particle Proportion of hollowed particles (%) | Vacancy diameter ratio | Polymer yield per g of solid catalyst component (g) | Isotactic index (%) | BD | Average particle diameter of powder (micron) | MFR | YI |
|---|---|---|---|---|---|---|---|---|
| 8 | >90 | 0.4 | 4250 | 99.4 | 0.46 | 830 | 4.5 | 3.1 |
| 9 | >90 | 0.3 | 4270 | 99.3 | 0.45 | 840 | 3.9 | 3.0 |
| 10 | >90 | 0.4 | 4300 | 99.1 | 0.44 | 810 | 4.1 | 2.9 |

TABLE 3-continued

| | Preparation conditions of solid catalyst component and polymerization results (II) | | | | | | | |
|---|---|---|---|---|---|---|---|---|
| 11 | >90 | 0.3 | 4070 | 98.5 | 0.44 | 810 | 4.6 | 2.8 |
| 12 | >50 | 0.2 | 4180 | 98.9 | 0.47 | 790 | 4.3 | 2.9 |
| 13 | >90 | 0.4 | 4030 | 98.8 | 0.45 | 890 | 4.4 | 2.7 |
| 14 | >90 | 0.4 | 4010 | 99.4 | 0.43 | 1070 | 4.1 | 3.1 |

Note:
DEAC diluent solvent: (Nos. 8, 9, 11, 12, 13: n-hexane, No. 10: n-octane)

EXAMPLES 15-18

Example 8 was repeated except that the quantity of diisoamyl ether used in the preparation of the reaction product (I) and the quantity of $TiCl_4$ used in the preparation of the solid product (II) were replaced by those indicated in Table 4 to obtain solid catalyst components, and propylene gas phase polymerization was carried out.

The preparation conditions of the solid catalyst components and the results of Examples 15–18 are shown in Table 4.

EXAMPLES 19-24

Example 8 was repeated except that the time, temperature and agitation in the reaction wherein the reaction product (I) was dropwise added to $TiCl_4$ were replaced by those indicated in Table 5 to obtain solid catalyst components, and propylene gas phase polymerization was carried out.

The preparation conditions of the solid catalyst components and the results of Examples 19–24 are shown in Table 5.

EXAMPLES 25-28

Example 8 was repeated except that the organoaluminum compound ($A_1$) and the electron donor ($B_1$) used in the preparation of the reaction product (I) and the electron donor ($B_2$) used in the preparation of the solid catalyst component from the solid product (II) were replaced by the combinations indicated in Table 6, to obtain solid catalyst components, and propylene gas phase polymerization was carried out.

The preparation conditions of the solid catalyst components and the results of Example 25–28 are shown in Table 6.

TABLE 4

Preparation conditions of solid catalyst component and polymerization results (II)

| | | | | | | In polymer particle | | |
|---|---|---|---|---|---|---|---|---|
| Example | DiAE (mol) | $TiCl_4$ (mol) | Power required for agitation (KW/m³) | dv | Qa | Proportion of hollowed particles (%) | Vacancy diameter ratio | |
| 15 | 2.83 | 9.10 | 0.27 | 36.2 | 1.0 | >75 | 0.2 | |
| 16 | 2.02 | 9.10 | 0.20 | 45.3 | 1.8 | >90 | 0.5 | |
| 17 | 2.83 | 11.11 | 0.29 | 38.4 | 1.3 | >90 | 0.3 | |
| 18 | 2.42 | 7.07 | 0.25 | 40.6 | 1.4 | >75 | 0.1 | |

| Example | Polymer yield per g of solid catalyst component (g) | Isotactic index (%) | BD (g/ml) | Average particle diameter of powder (micron) | MFR | YI |
|---|---|---|---|---|---|---|
| 15 | 4160 | 98.9 | 0.47 | 730 | 4.3 | 2.9 |
| 16 | 3960 | 99.4 | 0.45 | 780 | 4.0 | 3.1 |
| 17 | 4430 | 99.3 | 0.48 | 810 | 3.8 | 2.8 |
| 18 | 3870 | 98.6 | 0.44 | 790 | 4.4 | 2.8 |

TABLE 5

Preparation conditions of solid catalyst component and results (III)

| | Time required for dropwise adding reaction product (I) (hr) | Temperature (°C.) | Power required for agitation (KW/m³) | dv | Qa | In polymer particles | |
|---|---|---|---|---|---|---|---|
| Example | | | | | | Proportion of hollowed particles (%) | Vacancy diameter ratio |
| 19 | 2 | 40 | 0.22 | 32.0 | 1.0 | >50 | 0.2 |
| 20 | 6 | " | 0.23 | 50.6 | 1.5 | >90 | 0.5 |
| 21 | 5 | 34 | 0.24 | 38.2 | 1.2 | >90 | 0.3 |
| 22 | " | " | 0.55 | 33.8 | 1.3 | >75 | 0.3 |
| 23 | 3 | 46 | 0.31 | 43.3 | 1.4 | >75 | 0.4 |
| 24 | " | " | 0.73 | 36.1 | 1.5 | >50 | 0.2 |

| Example | Polymer yield per g of solid catalyst component (g) | Isotactic index (%) | BD (g/ml) | Average particle diameter of powder (micron) | MFR | YI |
|---|---|---|---|---|---|---|
| 19 | 4330 | 99.5 | 0.47 | 650 | 4.3 | 2.9 |
| 20 | 3920 | 99.1 | 0.43 | 980 | 4.1 | 3.1 |
| 21 | 4150 | 98.9 | 0.46 | 750 | 4.7 | 2.8 |
| 22 | 4130 | 99.1 | 0.47 | 690 | 4.5 | 2.9 |
| 23 | 3970 | 99.2 | 0.46 | 850 | 4.3 | 3.0 |

TABLE 5-continued

| Preparation conditions of solid catalyst component and results (III) | | | | | |
|---|---|---|---|---|---|
| 24 | 4060 | 99.5 | 0.46 | 710 | 4.1 | 2.7 |

TABLE 6

Preparation conditions of solid catalyst component and results (IV)

| Example | Organoaluminum compound ($A_1$) | Electron donor ($B_1$) | Electron donor ($B_2$) | Power required for agitation ($KW/m^3$) | dv | Qa |
|---|---|---|---|---|---|---|
| 25 | *1 DEAC | *5 Di-n-butyl ether | *5 Di-n-butyl ether | 0.22 | 36.7 | 1.3 |
| 26 | *2 EASC | *6 Di-isoamyl ether | *5 Di-n-butyl ether | 0.24 | 38.5 | 1.2 |
| 27 | *3 EADC | *5 Di-n-butyl ether | *5 Di-n-butyl ether | 0.23 | 39.3 | 1.4 |
| 28 | *4 DnPAC | *7 Di-n-amyl ether | *7 Di-n-amyl ether | 0.23 | 32.4 | 1.2 |

| Example | In polymer particles Proportion of hollowed particles (%) | In polymer particles Vacancy diameter ratio | Polymer yield per g of solid catalyst component (g) | Isotactic index (%) | BD | Average diameter of powder (micron) | MFR | YI |
|---|---|---|---|---|---|---|---|---|
| 25 | >90 | 0.2 | 4180 | 99.1 | 0.45 | 730 | 4.1 | 2.8 |
| 26 | >90 | 0.4 | 3950 | 99.0 | 0.44 | 750 | 4.3 | 3.1 |
| 27 | >90 | 0.3 | 3730 | 98.3 | 0.43 | 750 | 4.0 | 3.1 |
| 28 | >75 | 0.2 | 3850 | 99.2 | 0.46 | 630 | 4.2 | 2.9 |

Note:
*1 DEAC: diethylaluminum monochloride
*2 EASC: ethylaluminum sesquichloride
*3 EADC: ethylaluminum dichloride
*4 DnPAC: di-n-propylaluminum chloride
*5 Di-n-butyl ether
*6 Di-isoamyl ether
*7 Di-n-amyl ether

EXAMPLE 29

Into a 2 l capacity stainless reactor equipped with slant blades and purged with nitrogen gas were added propylene (30 g), diethylaluminum monochloride (105 mg): diethylene glycol dimethyl ether (3.3 mg), and the solid catalyst component (35 mg) obtained in Example 17, followed by reacting the mixture under 9.8 $Kg/cm^2G$ for 15 minutes and removing unreacted propylene to obtain a preactivated catalyst in the form of powder particles (propylene reacted per g of the solid catalyst component: 149 g).

Into the reactor containing the resulting preactivated catalyst were introduced diethylaluminum monochloride (210 mg) and hydrogen (300 ml), followed by continuously feeding ethylene (16 g) and butene-1 (35 g) under a propylene partial pressure of 20 $Kg/cm^2G$, at 65° C. for 2 hours to carry out propylene-ethylenebutene-1 copolymerization.

After completion of the reaction, methanol (30 g) was introduced to carry out killing reaction at 65° C. for 30 minutes, followed by cooling the mixture down to room temperature and drying the resulting polymer to obtain a propylene-ethylene-butene-1 copolymer (186 g) (ethylene content: 8.1%, butene-1 content: 5.9%, and MFR: 4.7). The polymer had a BD of 0.43; the polymer particles had a shape close to sphere; and the quantities of fine powder and aggregate were small. The angle of repose: 39.0°, the percentage compaction of BD: 11.6%; the yellowness index: 2.7. Most of the resulting polymer particles were hollowed particles having a vacancy diameter ratio of 0.4.

EXAMPLES 30–31

Example 29 was repeated except that the solid catalyst components obtained in Example 3 and Example 20 were used, to carry out preparation of α-olefin polymerization catalysts and propylene-ethylenebutene-1 copolymerization.

The results of Examples 30–31 are shown in Table 7 together with those of Example 29.

EXAMPLE 32

Into a 2 l capacity stainless reactor equipped with slant blades was introduced polypropylene powder (5.0 g) obtained Example 2, followed by carrying out vacuum degassing, drying and purging with nitrogen gas, then introducing diethylaluminum monochloride (58 mg), the solid catalyst component (30 mg) obtained in Example 22 and methyl p-toluylate (4.5 mg) and reacting ethylene (0.15 g) with the mixture at 20° C. for 4 hours to obtain a preactivated α-olefin polymerization catalyst.

Into the above reactor were added diethylaluminum monochloride (210 g) and hydrogen (700 ml), followed by polymerizing propylene under a propylene partial pressure of 20 $Kg/cm^2$ G at 70° C. for 3 hours and feeding a mixed monomer of propylene and ethylene ($C_2$=% by mol: 20%) for one hour to carry out propylene-ethylene copolymerization.

After completion of the reaction, methanol (3 g) was introduced, followed by carrying out killing reaction at 70° C. for 30 minutes, cooling down to room temperature and drying the resulting polymer to obtain a propylene-ethylene copolymer (330 g) (ethylene content: 17.9%, MFR: 3.6). The polymer had a BD of 0.43; its shape was close to sphere; the proportion of particles having a particle size of 16-42 meshes was 98.8%; and the quantities of fine powder and aggregate were very small. Angle of repose: 40.5°. Percentage compaction of BD: 13.0%. Yellowness index: 2.5. Most of the resulting polymers were hollowed particles having a vacancy in a vacancy diameter ratio of 0.5 to 0.6.

COMPARATIVE EXAMPLE 4

Example 32 was repeated except that the solid catalyst component obtained in Example 32 was replaced by the solid catalyst component obtained in Comparative example 1, to carry out propylene-ethylene block copolymerization.

The results of Comparative example 4 are shown in Table 7 together with those of Example 32.

Further, the physical properties of the solid catalyst components of Examples 8, 16 and 20 and Comparative examples 1-3 are shown in Table 1 together with the preparation results of the solid catalyst component of Example 1.

Further, the microscopic photograph of the cut surface of the polymer particle of Example 8 is shown in the drawing.

As shown in Table 8, no remarkable difference is observed between the solid catalyst components of the respective Examples and those of the respective Comparative examples in the aspect of X-rays diffraction figures.

Still further, with regard to their physical properties, no remarkable difference is observed therebetween in the aspect of the specific surface area, but with regard to the proportion of hollowed particles and the vacancy diameter ratio of the particles of the solid catalyst components, remarkable differences are observed.

TABLE 7

Preparation conditions of solid catalyst component and results (V)

| Example | Solid catalyst component | In polymer particles | | Copolymer yield per g of solid catalyst component (g) | Comonomer content in copolymer | |
|---|---|---|---|---|---|---|
| | | Proportion of hollowed particles (%) | Vacancy diameter ratio | | Ethylene (%) | Butene-1 (%) |
| 29 | Same as in Ex. 17 | >90 | 0.4 | 5310 | 7.9 | 5.9 |
| 30 | Same as in Ex. 3 | >50 | 0.2 | 5370 | 8.0 | 6.1 |
| 31 | Same as in Ex. 20 | >90 | 0.5 | 5190 | 8.3 | 5.7 |
| 32 | Same as in Ex. 22 | >75 | 0.4 | 11300 | 17.9 | — |
| Comp. 4 | Same as in Comp. ex. 2 | 0 | 0 | 9740 | 18.3 | — |

| Example | MFR | BD (g/ml) | 4-Meshes on (%) | 70-Meshes pass (%) | Angle of repose (°) | Percentage compaction of BD (%) | YI |
|---|---|---|---|---|---|---|---|
| 29 | 4.7 | 0.43 | 0.4 | 0.7 | 39.0 | 11.6 | 2.7 |
| 30 | 4.8 | 0.42 | 0.7 | 0.8 | 38.5 | 9.5 | 2.8 |
| 31 | 5.0 | 0.38 | 0.5 | 0.4 | 40.5 | 10.5 | 2.8 |
| 32 | 3.6 | 0.41 | 0.6 | 0.5 | 40.5 | 12.2 | 2.5 |
| Comp. 4 | 3.3 | 0.36 | 7.8 | 20.3 | 43.5 | 25.0 | 2.9 |

TABLE 8

Physical properties of solid catalyst component

| Example and Comp. ex. | X-ray diffraction (Å) | | | | | | Specific surface area (m²/g) | Proportion of hollowed particles (%) | Vacancy diameter ratio (micron) |
|---|---|---|---|---|---|---|---|---|---|
| Example | | | | | | | | | |
| 1 | 4.85 s | 2.76 s | 2.14 w | 1.79 m | 1.72 w | 1.45 ww | 172 | >90 | 0.3 |
| 8 | 4.86 s | 2.7 s | 2.14 w | 1.78 m | 1.70 m | 1.44 ww | 187 | >90 | 0.4 |
| 16 | 4.85 s | 2.77 s | 2.15 w | 1.80 m | 1.72 m | 1.44 w | 161 | >90 | 0.5 |
| 20 | 4.88 s | 2.76 s | 2.14 w | 1.79 m | 1.71 w | 1.45 ww | 177 | >90 | 0.5 |
| Compr. ex. | | | | | | | | | |
| 1 | 4.85 s | 2.78 s | 2.14 w | 1.79 m | 1.71 w | 1.45 ww | 151 | 0 | 0 |
| 2 | 4.88 s | 2.76 s | 2.15 w | 1.80 m | 1.72 m | 1.44 ww | 168 | <10 | 0.1 |
| 3 | 4.87 s | 2.78 s | 2.14 w | 1.80 m | 1.71 w | 1.45 w | 174 | <20 | 0.2 |

What we claim is:

1. A solid catalyst component for α-olefin polymerization which contains titanium trichloride as an active ingredient and is in the form of hollow fine particles.

2. A solid catalyst component according to claim 1 wherein the ratio of the average diameter of the vacancy inside the particles to the average outer diameter of the particles is 0.1 or more.

3. A solid catalyst component according to claim 1 wherein particles having a ratio of the average diameter of the vacancy inside the particles to the average outer diameter of the particles of 0.1 or more are contained therein in 30% by weight or more based on the weight of the total particles of the solid catalyst component.

4. A solid catalyst component according to claim 1 which has an average particle diameter of 15 to 80 microns; is hollow; and has a ratio of the diameter of the vacancy inside the particles to the outer diameter of the particles of 0.1 or more.

5. A solid catalyst component according to claim 1 which is a titanium trichloride composition having a diffraction line corresponding to a distance between gratings of 4.80 to 5.10 Å by way of diffraction of X-rays and a specific surface area of 100 m$^2$/g or more.

6. A process for producing a solid catalyst component for α-olefin polymeri-zation, which process comprises adding a reaction product (I) of an organoaluminum compound (A) with an electron donor (B$_1$) to TiCl$_4$ the atomic ratio of Al:Ti being 0.05:1.0 and reacting these under agitation in a baffle ratio of 0.35 or less with a power required for agitation of 2.50 KW/m$^3$ or less at a temperature of 0° to 70° C. for a period of 1 to 10 hours and further reacting an electron donor (B$_2$) and an electron acceptor (E) with the resulting solid product (II) to obtain a solid product (III).

7. A production process according to claim 6 wherein TiCl$_4$ diluted with an inert solvent is used.

8. A production process according to claim 6 wherein after completion of the addition of said reaction product (I), the reaction mixture is kept at the temperature and under the agitation at the time of the addition for 0.5 minute to 3 hours, and further kept at 50° to 90° C. for 5 minutes to 3 hours under agitation.

9. A production process according to claim 6 wherein a reaction product (I) obtained by reacting 1 to 4 mols of electron donor (B$_1$) with one mol of an organoaluminum compound (A) in the presence of 0.5 to 3 l of an inert solvent, at −10° to +50° C. and for 30 seconds to 5 hours.

* * * * *